United States Patent
Jones et al.

(10) Patent No.: US 9,361,283 B2
(45) Date of Patent: Jun. 7, 2016

(54) METHOD AND SYSTEM FOR PROJECTING TEXT ONTO SURFACES IN GEOGRAPHIC IMAGERY

(75) Inventors: Jonah Jones, Darlinghurst (AU); Matthew Robert Simpson, San Francisco, CA (US)

(73) Assignee: Google Inc., Mountain View, CA (US)

( * ) Notice: Subject to any disclaimer, the term of this patent is extended or adjusted under 35 U.S.C. 154(b) by 824 days.

(21) Appl. No.: 13/307,381

(22) Filed: Nov. 30, 2011

(65) Prior Publication Data

US 2015/0178257 A1 Jun. 25, 2015

(51) Int. Cl.

| | |
|---|---|
| G06T 15/00 | (2011.01) |
| G09G 5/00 | (2006.01) |
| G08G 1/123 | (2006.01) |
| G06F 17/24 | (2006.01) |
| G06T 19/00 | (2011.01) |
| G08G 1/00 | (2006.01) |
| G08G 1/0969 | (2006.01) |
| H04N 5/445 | (2011.01) |
| G09G 5/14 | (2006.01) |

(52) U.S. Cl.
CPC .............. *G06F 17/241* (2013.01); *G06T 19/00* (2013.01); *G06T 19/006* (2013.01); *G08G 1/0969* (2013.01); *G08G 1/205* (2013.01); *G09G 5/14* (2013.01); *H04N 5/44504* (2013.01); *G06T 2219/004* (2013.01)

(58) Field of Classification Search
USPC ................. 345/629, 632, 633, 634, 636, 419; 340/988, 995.1, 995.14, 995.19, 340/995.28; 701/400, 420, 421, 431, 436, 701/440
See application file for complete search history.

(56) References Cited

U.S. PATENT DOCUMENTS

| | | | |
|---|---|---|---|
| 6,222,583 B1 * | 4/2001 | Matsumura et al. | 348/113 |
| 7,451,041 B2 | 11/2008 | Laumeyer et al. | |
| 7,941,269 B2 | 5/2011 | Laumeyer et al. | |
| 7,953,295 B2 | 5/2011 | Vincent et al. | |
| 7,990,394 B2 | 8/2011 | Vincent et al. | |
| 8,072,448 B2 | 12/2011 | Zhu et al. | |
| 2003/0011599 A1 | 1/2003 | Du | |
| 2005/0116964 A1 * | 6/2005 | Kotake et al. | 345/629 |
| 2005/0179703 A1 | 8/2005 | Johnson | |
| 2006/0004512 A1 | 1/2006 | Herbst et al. | |

(Continued)

FOREIGN PATENT DOCUMENTS

| | | |
|---|---|---|
| WO | WO 2009/091559 | 7/2009 |
| WO | WO 2010/114878 | 10/2010 |

OTHER PUBLICATIONS

Sample Screen Shot from Tom Clancys Splinter Cell Conviction.

(Continued)

*Primary Examiner* — Ke Xiao
*Assistant Examiner* — Andrew Shin
(74) *Attorney, Agent, or Firm* — Dority & Manning, P.A.

(57) ABSTRACT

A user interface for viewing imagery associated with a geographic area, such as street level imagery is disclosed. The interface includes at least one text annotation projected in the three-dimensional space defined by the imagery onto a surface, such as a generally vertical surface, of an object depicted in the imagery. For example, the text annotation can be rendered such that the annotation appears to be located along the façade of a building depicted in the imagery. The projection of text annotations in the three-dimensional space can provide a more immersive, augmented reality-style view of the geographic area of interest.

24 Claims, 7 Drawing Sheets

(56) References Cited

U.S. PATENT DOCUMENTS

| | | | |
|---|---|---|---|
| 2006/0071948 A1* | 4/2006 | Hemmings | 345/649 |
| 2006/0241860 A1 | 10/2006 | Kimchi et al. | |
| 2007/0288844 A1* | 12/2007 | Zingher et al. | 715/529 |
| 2008/0122839 A1 | 5/2008 | Berglund et al. | |
| 2008/0292213 A1 | 11/2008 | Chau | |
| 2009/0179895 A1 | 7/2009 | Zhu et al. | |
| 2010/0080551 A1* | 4/2010 | Chen et al. | 396/310 |
| 2010/0123737 A1 | 5/2010 | Williamson et al. | |
| 2010/0168997 A1* | 7/2010 | Sakamoto | 701/200 |
| 2010/0215250 A1 | 8/2010 | Zhu | |
| 2010/0293173 A1* | 11/2010 | Chapin et al. | 707/759 |
| 2010/0302594 A1* | 12/2010 | Chapman et al. | 358/1.18 |
| 2011/0242271 A1 | 10/2011 | Ogale et al. | |
| 2011/0254915 A1 | 10/2011 | Vincent et al. | |
| 2011/0302527 A1* | 12/2011 | Chen et al. | 715/800 |
| 2012/0019513 A1* | 1/2012 | Fong et al. | 345/419 |

OTHER PUBLICATIONS

Kolbe, "Augmented Videos and Panoramas for Pedestrian Navigation", Proceedings of the $2^{nd}$ Symposium on Location Based Services & TeleCartography 2004 from Jan. 28-29 in Vienna, 10 pages.

* cited by examiner

METHOD AND SYSTEM FOR PROJECTING TEXT ONTO SURFACES IN GEOGRAPHIC IMAGERY

FIELD

The present disclosure relates generally to displaying imagery, and more particularly to displaying text in association with geographic imagery, such as immersive panoramic imagery.

BACKGROUND

Computerized systems and methods for displaying imagery, in particular panoramic imagery are known. In the context of geographic information systems and digital mapping systems, services such as Google Maps are capable of providing street level images of geographical locations. The images, known on Google Maps as "Street View," typically provide immersive 360° panoramic views centered around a geographic area of interest. The panoramic views allow a user to view a geographic location from a street level perspective, as if the user was located on the street level or ground level associated with the geographic location.

User interfaces for navigating immersive panoramic views often include text labels, annotations, and other information, such as street names, business names, travel directions, and the like. Such annotations are generally used to provide helpful information associated with the geographic area to the user. Typically, text annotations are rendered in the user interface as a part of a two-dimensional overlay above the panoramic imagery. As a result, the text annotations float artificially in the display area, undermining the immersive nature of the street level viewing experience.

SUMMARY

Aspects and advantages of the invention will be set forth in part in the following description, or may be obvious from the description, or may be learned through practice of the invention.

One exemplary embodiment of the present disclosure is directed to a computer-implemented method for displaying imagery. The method includes presenting a viewport that displays at least a portion of an image of a geographic area. The image defines a three-dimensional space. The method includes receiving instructions to render a text annotation associated with an object depicted in the image. The instructions specify text effects for the text annotation. The method includes rendering a text annotation with text effects pursuant to the instructions such that the text annotation appears to be located in the three-dimensional space along at least a portion of a surface of the object depicted in the image.

Another exemplary embodiment of the present disclosure is directed to a system for providing images. The system includes a processing device and a network interface. The processing device is configured to receive a request for an image of a geographic area. The panoramic image defines a three dimensional space. The processing device is further configured to provide, via the network interface, at least a portion of the image and associated data to another processing device. The associated data includes instructions to render a text annotation such that the text annotation appears to be located in the three-dimensional space along a surface of an object depicted in the image.

Other exemplary implementations of the present disclosure are directed to systems, apparatus, computer-readable media, devices, and user interfaces for projecting text onto surfaces depicted in panoramic imagery.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
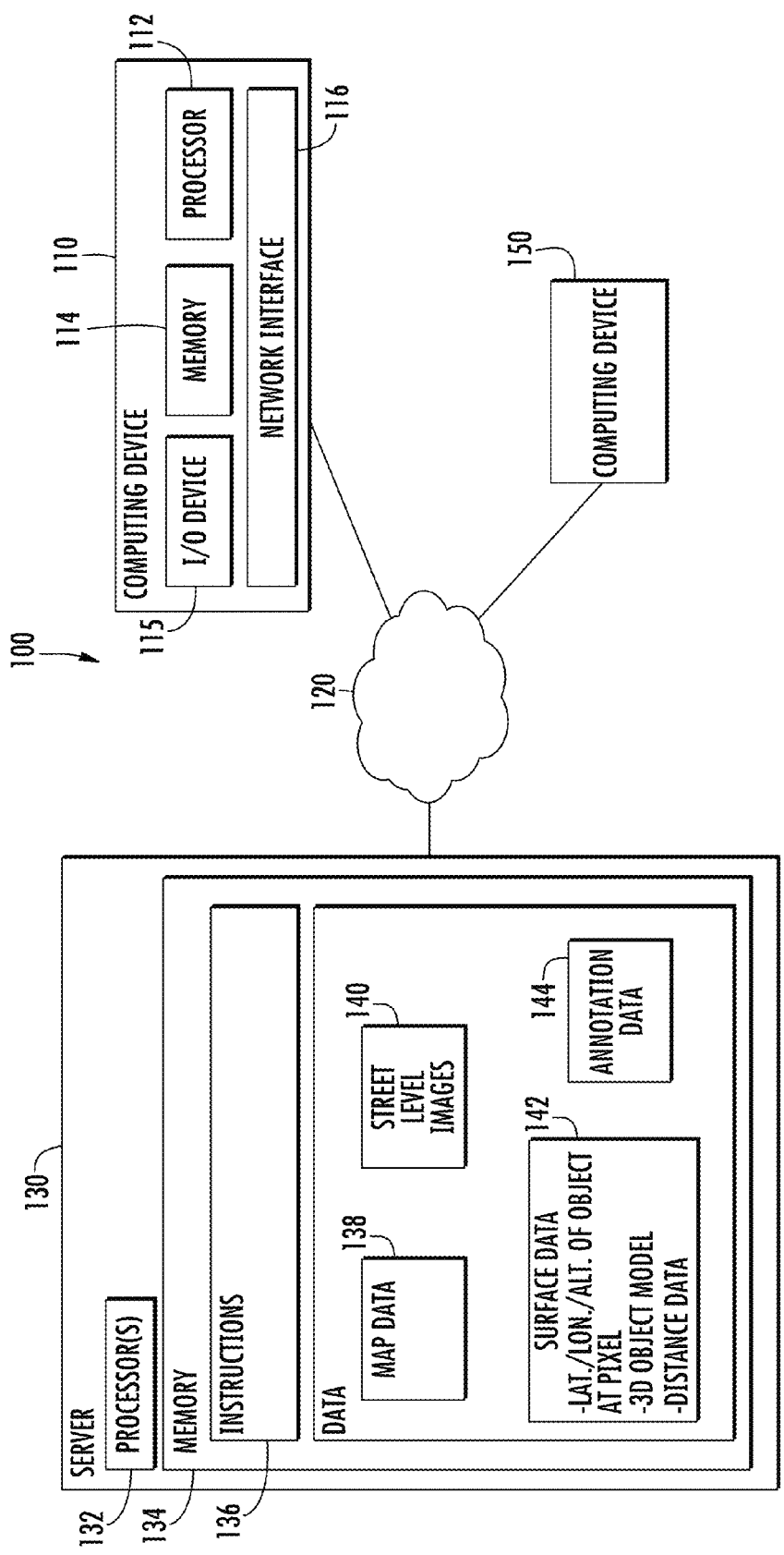
FIG. 1 depicts an exemplary system for displaying immersive panoramic imagery according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a user interface for viewing imagery associated with a geographic area, such as street level imagery. The interface includes at least one text annotation projected in the three-dimensional space defined by the imagery such that the text annotation appears to be located along a surface, such as a generally vertical surface, of an object depicted in the imagery. The text annotation can be projected into the three-dimensional space by rendering the text annotations with text effects that specify the sizing and orientation of the text annotation. The sizing and orientation of the text annotation can be determined based on surface position data such that when the text annotation is rendered with the text effects, the text annotation appears to be located in the three-dimensional space defined by the panoramic imagery along the surface of an object depicted in the imagery.

For instance, in a particular implementation, the user interface can render a text annotation onto the surface of a building depicted in the panoramic imagery such that the text annotation appears to run along the façade of the building depicted in the panoramic image. The text annotation can include information about the object on which it is rendered and/or can also form a part of travel directions presented to a user. For instance, a text annotation instructing a user to turn left or right at a particular intersection can be rendered such that the text annotation appears to be on the façade of a building proximate the intersection depicted in the panoramic imagery. The text annotation can also be interactive. For instance, upon user interaction with the text annotation, imagery associated with the next step in the travel directions can be displayed to the user.

By projecting the text annotation into the three-dimensional space defined by the panoramic imagery, as opposed to a two-dimensional overlay, the user interface provides a more immersive, augmented reality-style view of the geographic area of interest. Moreover, the projection of text annotations in the three-dimensional space defined by the panoramic imagery can assist with a user's comprehension and retention of the information set forth in the text annotation by providing a more familiar visual metaphor to the user.

FIG. 1 depicts an exemplary system 100 for displaying panoramic imagery according to an exemplary embodiment of the present disclosure. While the present disclosure is discussed with reference to immersive panoramic imagery, those of ordinary skill in the art, using the disclosures provided herein, should understand that the present subject matter is equally applicable for use with any type of imagery, such as the three-dimensional imagery provided in Google Earth, oblique view imagery, map imagery, satellite imagery or other suitable imagery.

As illustrated, system 100 includes a computing device 110 for displaying immersive panoramic images, such as street level images to a user. The computing device 110 device can take any appropriate form, such as a personal computer, smartphone, desktop, laptop, PDA, tablet, or other computing device. The computing device 110 includes appropriate input and output devices 115, such as a display screen, touch screen, touch pad, data entry keys, mouse, speakers, and/or a microphone suitable for voice recognition. A user can request panoramic imagery by interacting with an appropriate user interface on computing device 110. The computing device 110 can then receive panoramic imagery and data associated with the panoramic imagery and present at least a portion of the panoramic imagery through a viewport on any suitable output device, such as through a viewport set forth in a browser presented on a display screen.

Figure 2:
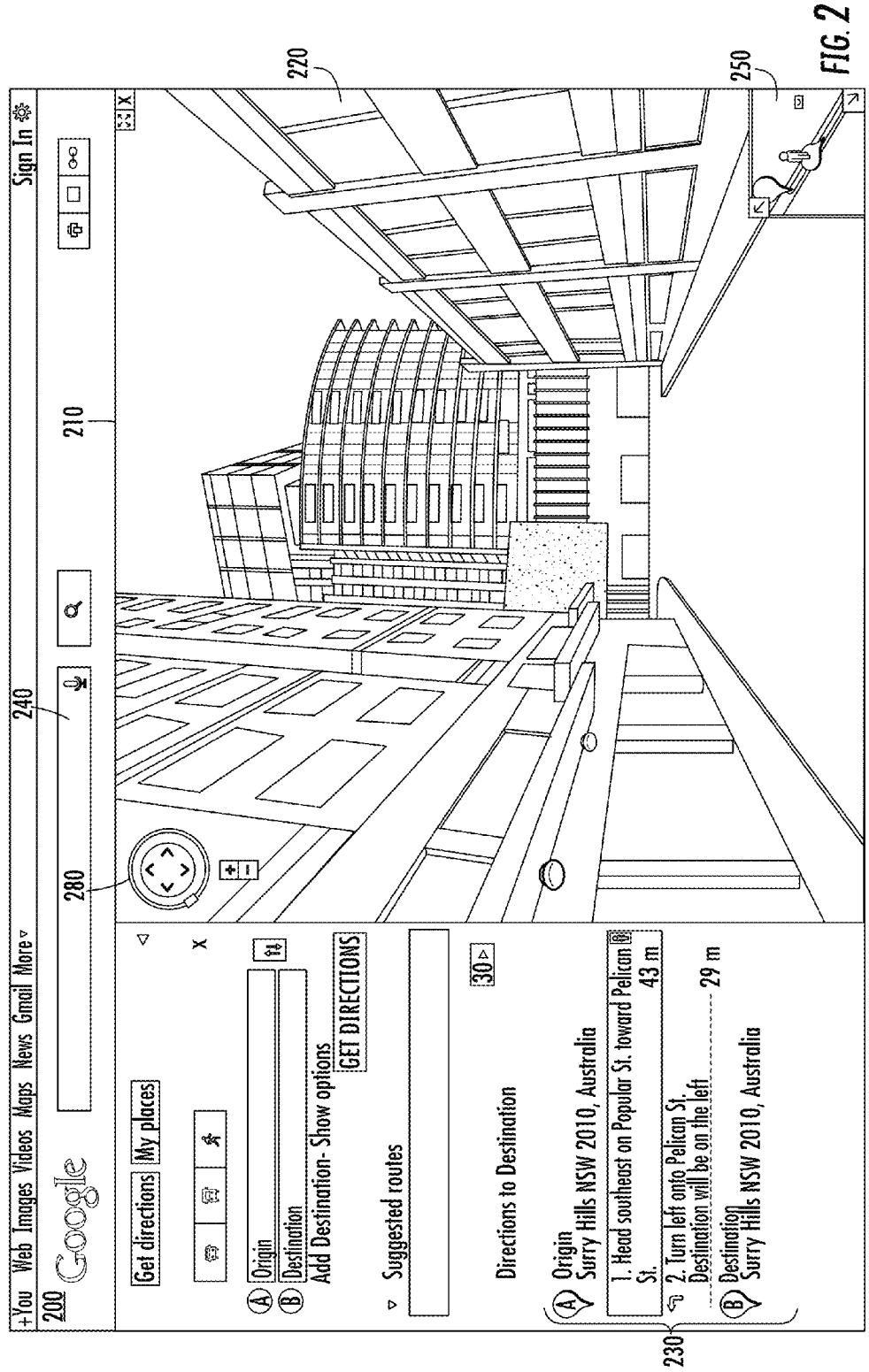
FIG. 2 depicts an exemplary user interface displaying immersive panoramic imagery according to an exemplary embodiment of the present disclosure.

FIG. 2 depicts an exemplary user interface 200, such as a browser, displaying exemplary immersive panoramic imagery. User interface 200 includes a viewport 210 that displays immersive panoramic imagery, such as street level imagery 220. Street level imagery 220 depicts images of objects captured by one or more cameras from a perspective at or near the ground level or street level. As shown, street level imagery 220 defines a three-dimensional space such that objects depicted in the imagery are each associated with a specific latitude, longitude, and altitude. As will be discussed in detail below, the systems and methods of the present disclosure will render a text annotation such that the text annotation appears to be located in the three-dimensional space defined by the immersive panoramic imagery to provide a more immersive viewing experience for a user.

Referring back to FIG. 1, the computing device 110 includes a processor(s) 112 and a memory 114. The processor(s) 112 can be any known processing device. Memory 114 can include any suitable computer-readable medium or media, including, but not limited to, RAM, ROM, hard drives, flash drives, or other memory devices. Memory 114 stores information accessible by processor(s) 112, including instructions that can be executed by processor(s) 112. The instructions can be any set of instructions that when executed by the processor(s) 112, cause the processor(s) 112 to provide desired functionality. For instance, the instructions can be software instructions rendered in a computer-readable form. When software is used, any suitable programming, scripting, or other type of language or combinations of languages can be used to implement the teachings contained herein. Alternatively, the instructions can be implemented by hard-wired logic or other circuitry, including, but not limited to application-specific circuits.

The computing device 110 can include a network interface 116 for accessing information over a network 120. The network 120 can include a combination of networks, such as cellular network, WiFi network, LAN, WAN, the Internet, and/or other suitable network and can include any number of wired or wireless communication links. For instance, computing device 110 can communicate through a cellular network using a WAP standard or other appropriate communication protocol. The cellular network could in turn communicate with the Internet, either directly or through another network.

Computing device 110 can communicate with another computing device 130 over network 120. Computing device 130 can be a server, such as a web server, that provides information to a plurality of client computing devices, such as computing devices 110 and 150 over network 120. Computing device 130 receives requests from computing device 110 and locates information to return to computing devices 110 responsive to the request. The computing device 130 can take any applicable form, and can, for instance, include a system that provides mapping services, such as the Google Maps services provided by Google Inc.

Similar to computing device 110, computing device 130 includes a processor(s) 132 and a memory 134. Memory 134 can include instructions 136 for receiving requests for geographic information, such as travel directions from a client device, and for providing the requested information to the client device for presentation to the user. Memory 134 can also include or be coupled to various databases containing information for presentation to a user. For instance, memory 134 can include a map database 138, a street level image database 140, a surface information database 142, and an annotation database 144.

Map database 138 stores map-related information, at least a portion of which can be transmitted to a client device, such as computing device 110. For instance, map database 138 can store map tiles, where each tile is an image of a particular geographic area. Depending on the resolution (e.g. whether the map is zoomed in or out), a single tile can cover an entire state in relatively little detail or just a few streets in high detail. The map information is not limited to any particular format. For example, the images can include street maps, satellite images, or combinations of these.

The various map tiles are each associated with geographical locations, such that the computing device 130 is capable of selecting, retrieving and transmitting one or more tiles in response to receipt of a geographical location. The locations can be expressed in various ways including but not limited to latitude/longitude positions, street addresses, points on a map, building names, and other data capable of identifying geographic locations.

The map database 138 can also include points of interest. A point of interest can be any item that is interesting to one or more users and that is associated with a geographical location. For instance, a point of interest can include a landmark, stadium, or building. A point of interest can be added to the map database 138 by professional map providers, individual users, or other entities.

The map database 138 can also store street information. In addition to street images in the tiles, the street information can include the location of a street relative to a geographic area or other streets. For instance, it can store information indicating whether a traveler can access one street directly from another street. Street information can further include street names where available, and potentially other information, such as distance between intersections and speed limits.

The street level image database 140 stores immersive panoramic images associated with the geographic locations. Street level images comprise images of objects at geographic locations captured by camera positioned at the geographic location from a perspective at or near the ground level or street level. An exemplary street level image 220 is depicted in FIG. 2. The street level image 220 can depict objects such as buildings, trees, monuments, etc. from a perspective of a few feet above the ground. Panoramic images can be created from the street level images to provide an immersive 360° panoramic view centered around a geographic area of interest.

The street level images can be stored as a set of pixels associated with color and brightness values. For instance, if the images are stored in JPEG format, the image can be displayed as a set of pixels in rows and columns, with each pixel being associated with a value that defines the color and brightness of the image at the pixel's location.

In addition to being associated with geographic locations, the street level images can be associated with information indicating the orientation of the image. For instance, the street level images used to provide immersive 360° panoramic views can include information indicating the particular orientation associated with the street level image.

Surface information database 142 stores information concerning the location of various surfaces of objects depicted in the street level images. As discussed with reference to FIG. 2, street level images define a three dimensional space such that objects depicted in the imagery are associated with a unique latitude, longitude, and altitude. Surface information database 142 stores information concerning the location of objects in the three-dimensional space defined by the street level imagery. As will be discussed in detail below, such information is used to locate the positions of surfaces, in the three dimensional space, of objects depicted in the street level imagery.

In one aspect, surface information database 142 stores values representing the geographic positions of the surfaces facing the camera in the street level imagery. In that regard, a separate value can be stored for each pixel of the street level image where the value represents the geographic position of the surface of the object illustrated in that particular pixel. For instance, a value representing latitude, longitude, and altitude information associated with the particular surface illustrated in the pixel can be associated with the pixel. In yet another aspect, surface information database 142 can include distance data that represents the distances of the surfaces of the object depicted in the street level imagery to the camera at each pixel of the street level image. For instance, a value representing the distance to the camera of the surface of the object depicted in the street level image can be associated with each pixel. Pixels that are not associated with a particular surface of an object depicted in the street level images can be associated with a null or default surface value.

In another aspect, surface information database 142 can store information associated with the locations of the surfaces depicted in street level images as polygons. In particular, a surface of an object depicted in the street view image can be defined as a polygon with four vertices. Each vertex can be associated with a different geographic location. A surface can be referenced in the surface information database as a set of vertices at the various geographic position associated with the object.

Other formats for storing surface information in the surface information database 142 can also be used. For instance, rather than being associated with absolute position values, such as latitude, longitude, and altitude, the values can be relative and in any scale. Moreover, even if a first type of information is used (such as storing latitude, longitude, and altitude information for the surface) information of another type can be generated from the first type of information (such as differences between positions to calculate distances).

Certain formats permit the surface information to be stored independently of the street level images. For instance, surface information data stored as polygons can be stored without reference to the street level image or camera position and can be retrieved by searching for surfaces having geographic locations near the location of the street level image.

A variety of systems and methods can be used to collect the surface information stored in surface information database 142. For instance, a laser range finder can be used. Alternatively, a three-dimensional model can be generated from a plurality of street view images using a variety of known techniques. For instance, stereoscope techniques can be used to analyze a plurality of street level images associated with the same scene to determine distances at each point in the images. Once the relative locations of the points in the images are known, a three-dimensional model associated with the geographic area can be generated. The three-dimensional model can include information such as the location of surfaces of objects depicted in the street level imagery. Computing device 130 can access the three-dimensional model to provide surface location information to one or more client devices, such as computing device 110.

Computing device 130 can also include an annotation database 144 that stores annotation data for annotations to be rendered in association with street level images. For instance, the annotation database 144 can store plain text information, such as building names, business names, travel directions, etc. that are to be rendered with a particular panoramic image. According to aspects of the present disclosure, the annotation database 144 can store text effects specifying text sizing and orientation information for the text annotations. The text effects can be determined based on surface information associated with objects depicted in a street level image, such as surface information stored in surface information database 142. In particular, the sizing and orientation of a particular annotation can be determined based on the surface information such that the text annotation appears to be located on the surface of an object depicted in the street level image.

Computing device 130 can provide mapping information, including street view images and associated text annotation information to computing device 110 over network 120. The information can be provided to computing device 110 in any suitable format. The information can include information in HTML code, XML messages, WAP code, Java applets, xhtml, plain text, voiceXML, VoxML, VXML, or other suitable format. The computing device 110 can display the information to the user in any suitable format. In one embodiment, the information can be displayed within a browser, such as Google Chrome or other suitable browser.

FIG. 2 depicts an exemplary user interface 200 displaying immersive panoramic imagery, such as street level imagery 220 through a viewport 210. User interface 200 can be a browser display that presents information associated with both a mapping service and immersive panoramic imagery. For instance, in addition to street level imagery 220, user interface could display a map and other information, such as travel directions 230 to a user.

The user interface 200 can provide flexibility to the user in requesting street level imagery associated with a geographic area to be displayed through viewport 210. For instance, the user can enter text in a search field 240, such as an address, the name of a building, or a particular latitude and longitude. The user could also use an input device such as a mouse or touchscreen to select a particular geographic location shown on a map. Yet further, the user interface 200 can provide an icon or other feature that allows a user to request a street level view at the specified geographic location. When providing a street level image through viewport 210, the user interface 200 can indicate the location and orientation of the view with a street level viewpoint signifier 250.

The street level image 220 can be displayed in the viewport 210 along with user-selectable controls 280 for changing the location and orientation of the viewpoint associated with the street level image 220. The controls can include controls for zooming the image in and out, as well as controls to change the orientation of the view, such as changing the direction from looking North to looking South. If the street level image was downloaded as an entire 360° panorama, changing the direction of the view may necessitate only displaying a different portion of the panorama without retrieving more information from a server. Other navigation controls can be included as well, such as controls in the form of arrows disposed along a street that can be selected to move the vantage point up and down the street.

Figure 3:
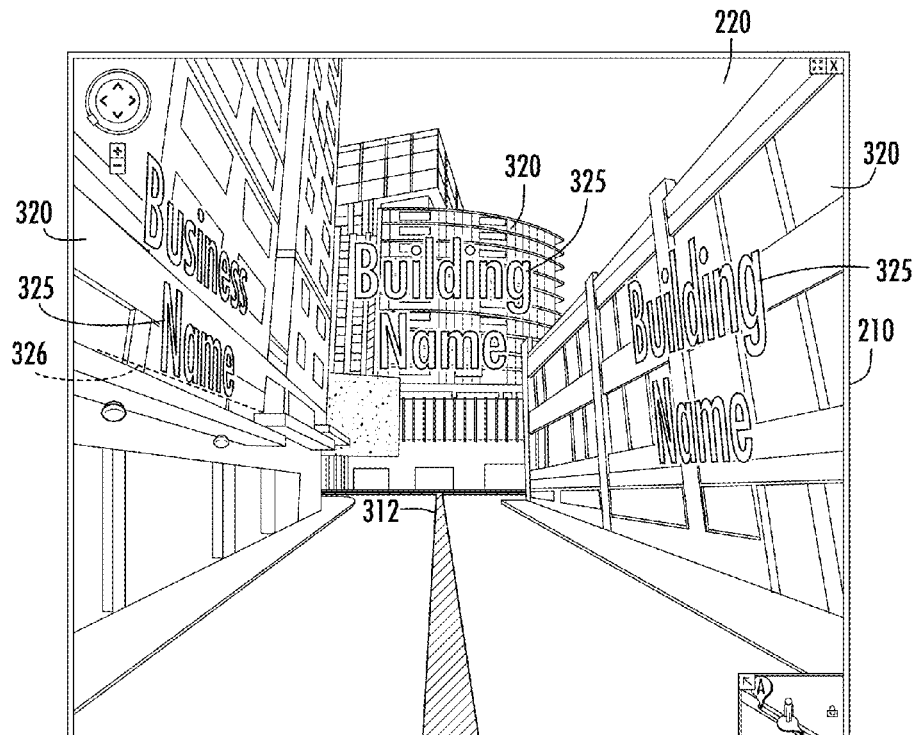
FIGS. 3-7 display exemplary immersive panoramic imagery comprising text annotations rendered in the three-dimensional space defined by the panoramic imagery according to exemplary embodiments of the present disclosure.

The user interface 200 can present various annotations in association with the street level imagery 220 to provide information to the user. For instance, as shown in FIG. 3, the street level imagery 220 can include street lines 312 positioned to correspond to the directions of the streets depicted in the street level imagery. The user interface 200 can also display various text annotations, such as text annotations that provide the names of points of interests, travel directions, etc.

According to aspects of the present disclosure, text annotations are projected into the three-dimensional space defined by the panoramic imagery to provide a more immersive and memorable navigation experience to the user. For example, FIG. 3 depicts an exemplary viewport 210 displaying street level imagery 220 that includes text annotations rendered such that the text annotations appear to be located in the three-dimensional space defined by the panoramic imagery.

More particularly, street level imagery 220 depicts various objects, including buildings 320. The objects can have a surface, such as a generally vertical surface, in the three-dimensional space defined by the street level imagery 220. A generally vertical surface is a surface that is oriented within 45° of a vertical (altitudinal) axis associated with imagery. The location of the surfaces of the objects depicted in the street level imagery 220 can be determined based on surface information data, such as data received from the surface information database 142. Text annotations can be rendered such that the text annotations appear to be located along the surfaces of objects depicted in the street level imagery.

In a particular embodiment, the text annotations are projected into the three-dimensional space by rendering the text annotations with text effects. The text effects can specify varying text sizes and orientations for the text annotation relative to the surface of the object such that when rendered, the text annotation appears to be located along at least a portion of the surface of the object depicted in the panoramic imagery.

For instance, street level imagery 220 includes text annotations 325 rendered along a surface of the buildings 320 depicted in the imagery 220. Text effects are used to make the text annotations 325 appear to be located along the façade of buildings 320. For instance, as illustrated in FIG. 3, text effects have been used to vary the text size of the characters in the text annotations relative to the surface of the object. The varying character sizes of the text annotation provide the text annotation a depth perspective relative to the panoramic image. The text effects can also specify that the text annotation is to be oriented in a common plane with the surface of a building such that the text annotation appears to be located on the façade of the building. As shown in FIG. 3, the text annotations 325 are rendered along a baseline 326 that is in a common plane with a surface of the buildings 320. The baseline 326 is depicted in FIG. 3 for illustration purposes. However, the baseline 326 can be an invisible line on which the characters in the text annotation appear to rest.

Other suitable techniques can be used to render the text annotations 325 such that the text annotations 325 appears to be located along a surface of the buildings 320. The text annotations 325 can be rendered by adjusting the pixel values associated with the buildings depicted in the panoramic image such that the annotations appear to be painted or otherwise applied onto the façade of the buildings depicted in the imagery.

The text annotations 325 can include information associated with the building on which they are rendered, such as the building name, a business name, an address, advertising, or other suitable information. For example, a business can pay or arrange to have its business name rendered on the façade of a building in street level imagery to provide advertising for the business. In addition, the text annotations rendered on the buildings can be generated based at least in part on information optionally provided by a user, such as user preferences, user points of interest, travel history, etc.

Figure 4:
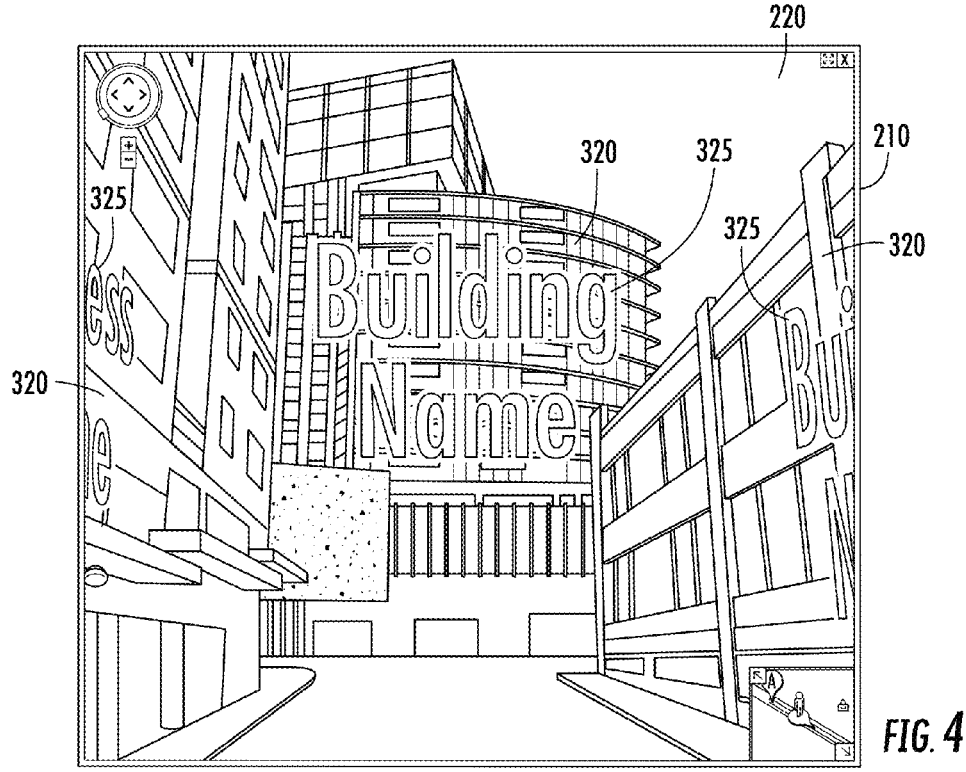

In a particular implementation, the text annotations can be fixed relative to the panoramic image such that as the user navigates the panoramic image, the text annotation remains in a fixed location. For instance, FIG. 4 depicts the street level imagery 220 of FIG. 3 after a user has zoomed in on the street level imagery 220. As illustrated, the text annotations 325 have remained in a fixed location relative to the imagery 220. As a result only a portion of text annotations 325 remain visible to the user. This further augments the appearance of the text annotations as part of the objects depicted in the street level imagery.

According to additional aspects of the present disclosure, the text annotations 325 can be interactive. For instance, upon user interaction with the text annotations 325, the user interface 200 can display additional information associated with the object on which a text annotation is rendered. This information can include hyperlinks to webpages that provide additional information associated with the object. Alternatively, the information can include advertising material associated with the object on which the text annotation is rendered.

Figure 5:
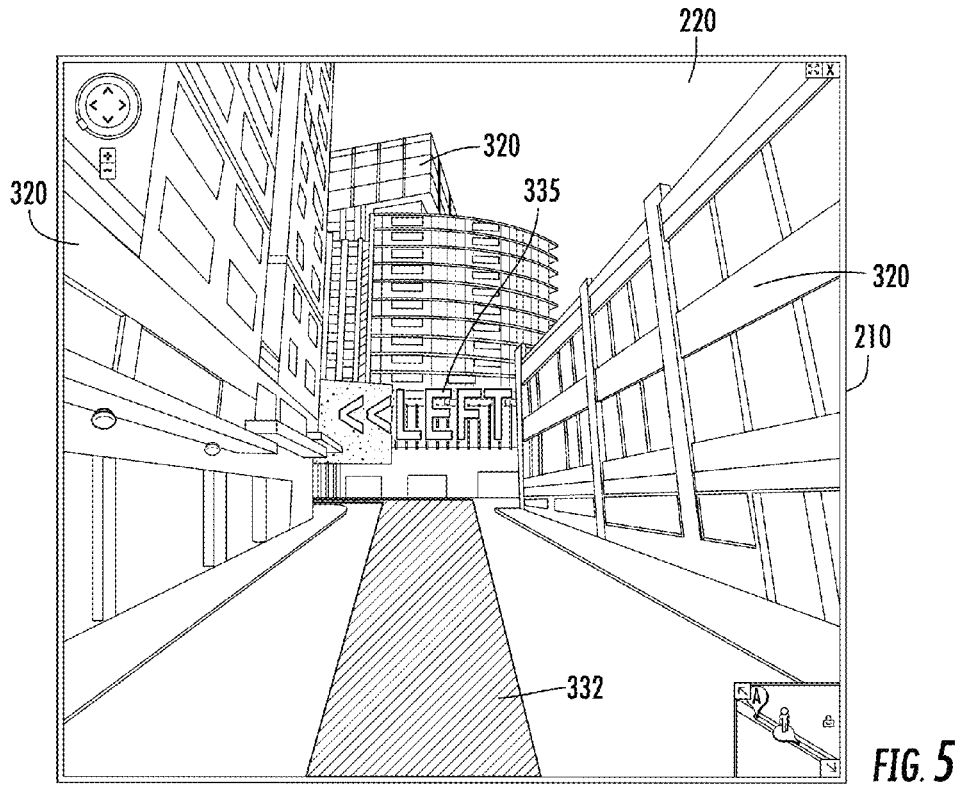

The text annotations can also be used to provide travel directions to a user. FIG. 5 depicts an exemplary viewport 210 displaying street level imagery 220 and travel directions to a user. The travel directions include a highlighted route 332 along the surface of the streets depicted in the imagery 220. A text annotation 335 comprising instructions to inform the user to turn in a particular direction at an intersection is rendered along the façade of a building 320 proximate the intersection.

In particular, the text annotation 335 informs the user to turn left at the intersection. As shown, the text annotation 335 can include additional characters, such as a left arrow, to provide additional visual cues to the user.

Figure 6:
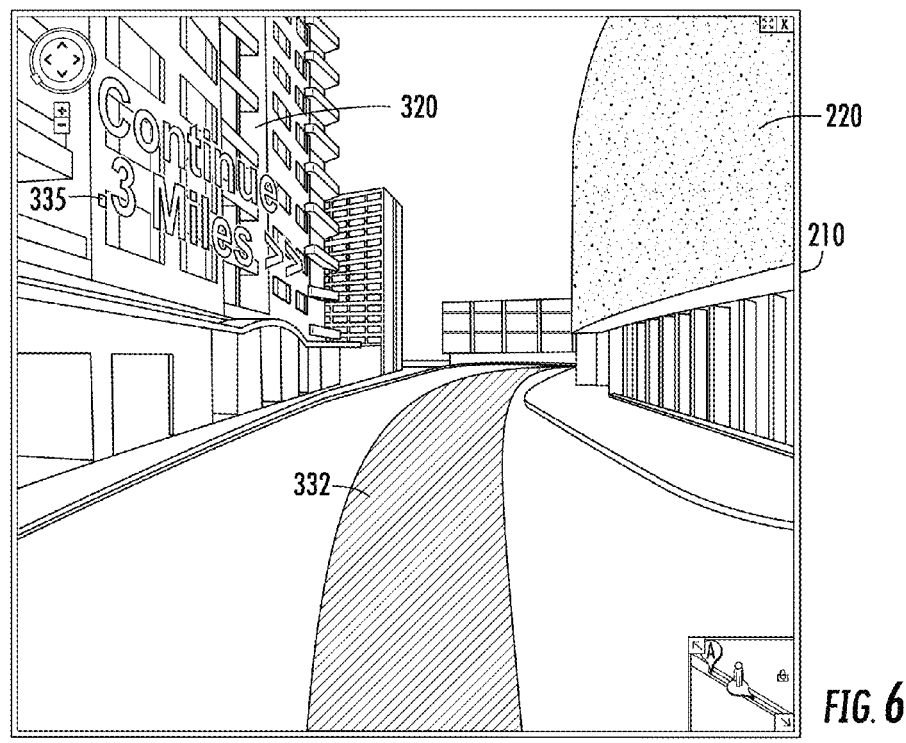

The text annotation 335 can be interactive such that when a user interacts with the text annotation, such as by clicking, tapping, or otherwise interacting with the text annotation 335, the user interface 200 will display panoramic imagery associated with the next step in the travel directions. For instance, FIG. 6 depicts a viewport 210 displaying street level imagery 220 associated with the next step in the travel directions. The imagery 220 includes a text annotation 335 providing the next step in the travel directions, "Continue .3 Miles", rendered on the façade of a building 320. A user could obtain the next step in the travel directions by interacting with the text annotation 335. The depth perspective provided by the text annotations can enhance a user's ability to remember the travel directions as the user is traveling from an origin to a destination.

Figure 7:
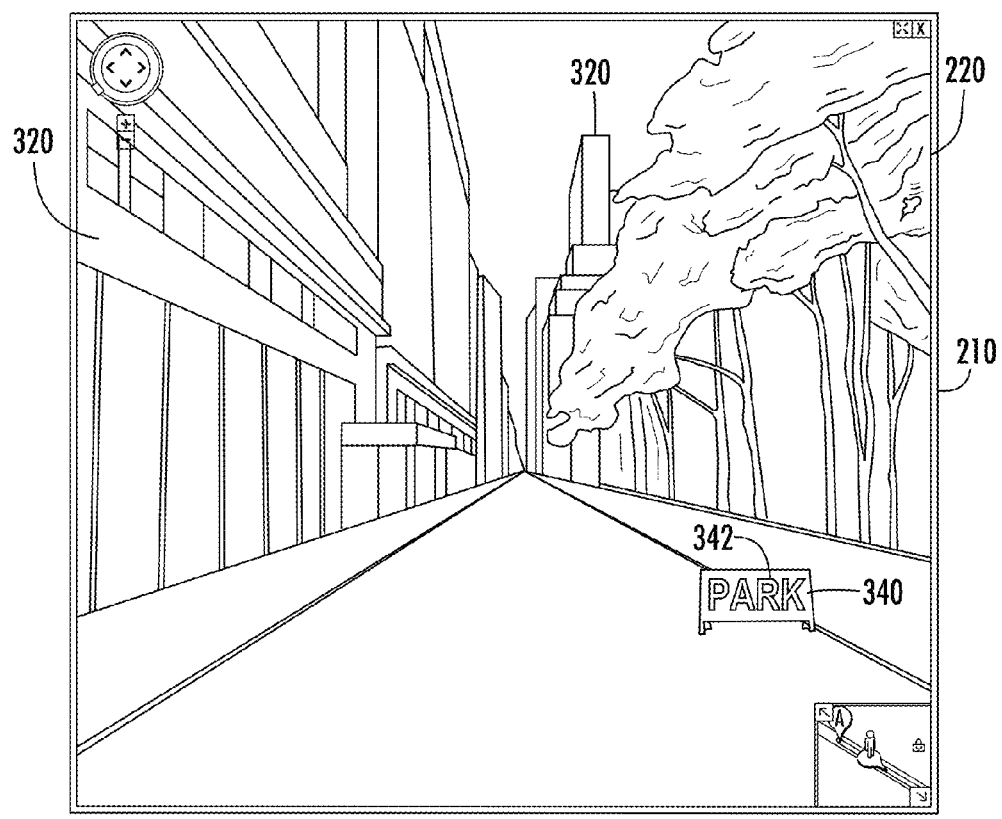

According to another exemplary aspect of the present disclosure, text annotations can be rendered along the surfaces of virtual objects rendered in the immersive panoramic imagery. For instance, FIG. 7 depicts a viewport 210 displaying street level imagery 220 having an object that does not have a surface convenient for rendering text annotations. In particular, FIG. 7 depicts a park in the street level imagery 220. Unlike a building the park does not have a surface convenient for rendering text annotations. Accordingly, a virtual object 340 has been rendered in the three-dimensional space defined by the imagery 220 proximate the park. A text annotation 342 has been rendered along a surface of the virtual object 340. In this manner, text annotations can be displayed in association with objects that may not have a convenient surface for displaying text annotations.

Figure 8:
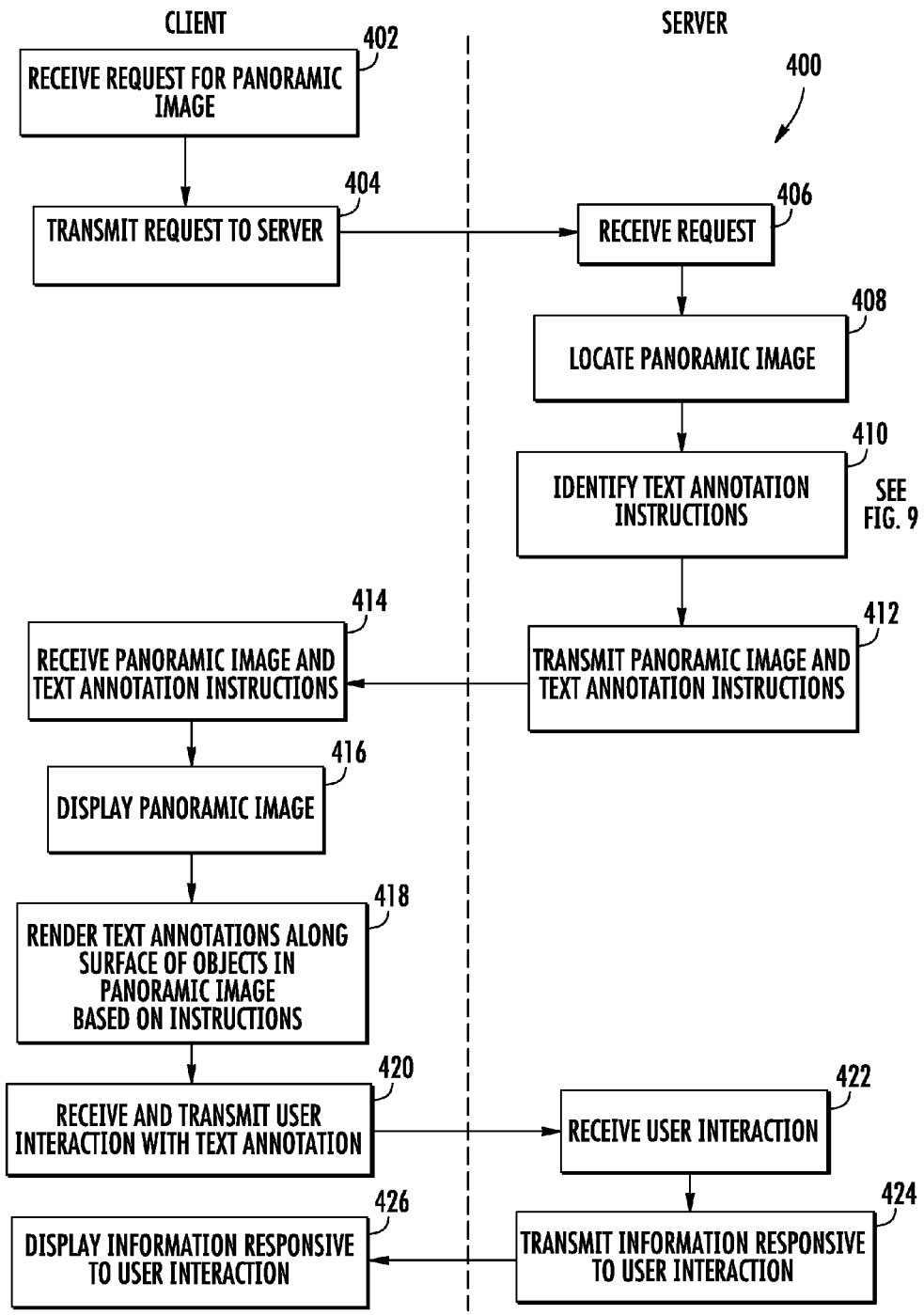
FIG. 8 provides a client-server flow diagram of an exemplary method according to an exemplary embodiment of the present disclosure.

FIG. 8 depicts a client-server flow diagram for an exemplary method 400 for providing panoramic imagery to a user according to an exemplary embodiment of the present disclosure. While the present disclosure is discussed with reference to a client-server relationship, those of ordinary skill in the art, using the disclosures provided herein, should understand that the subject matter of the present disclosure can be carried out on a single computing device, such as on a user's computing device.

At (402) the client device receives a request for a panoramic image from a user. The request for the panoramic image can be generated in any suitable manner. For instance, a user can request a panoramic image by inputting a particular geographic location in a search field of a browser on a computing device. Alternatively, a user can access an application on a mobile device and input a request for panoramic imagery associated with a particular geographic area.

The request is transmitted to the server over a network (404). The server receives the request for the panoramic image (406) and locates the panoramic image (408) for display to the user. For instance, the server can locate a particular panoramic image stored in a panoramic image database. At (410), the server identifies text annotation instructions to be provided to the client device. The text annotation instructions can specify the plain text of a particular text annotation as well as text effects to be used when rendering the text annotation. When the text annotation is rendered with text effects, the text annotation is projected into the three-dimensional space defined by the panoramic image.

Figure 9:
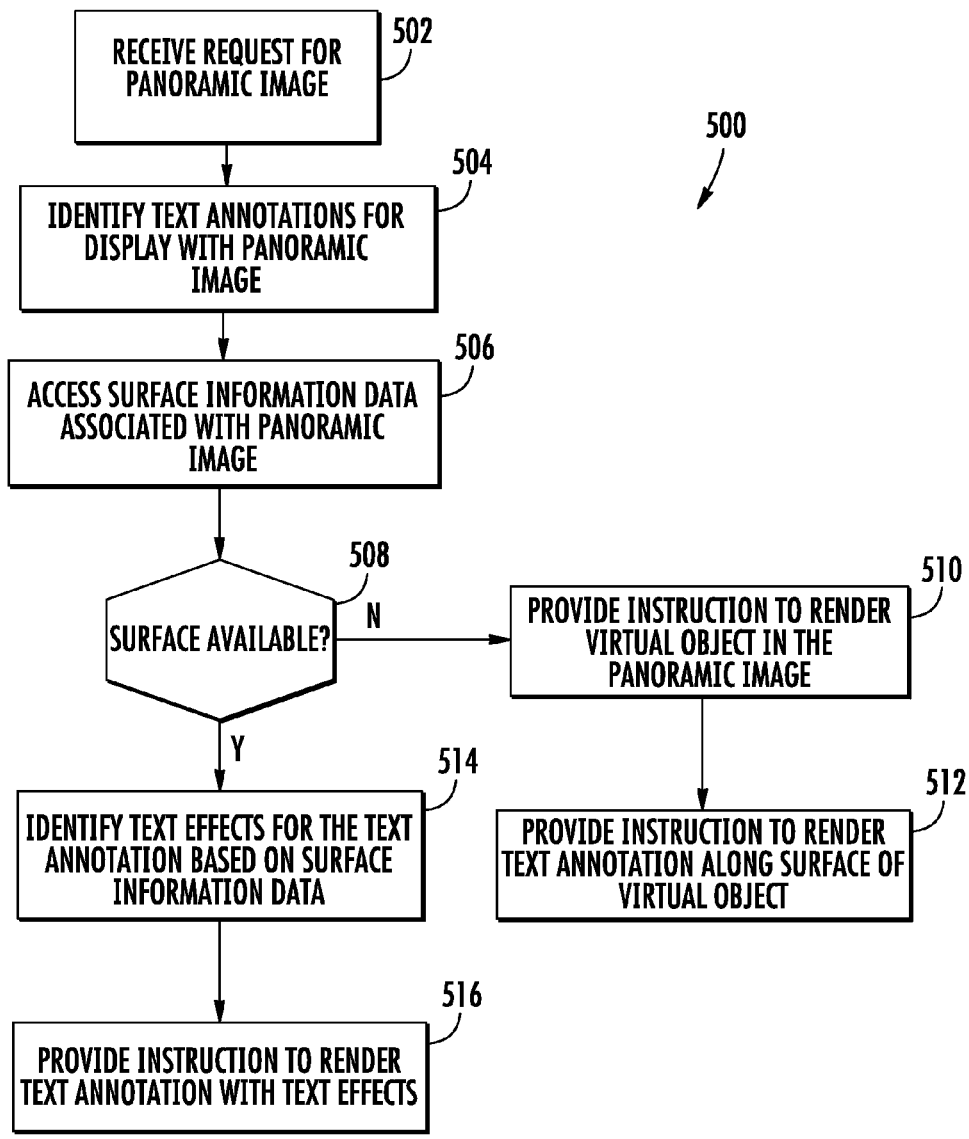
FIG. 9 provides a flow diagram of an exemplary method according to an exemplary embodiment of the present disclosure.

FIG. 9 depicts an exemplary method 500 for identifying text annotation instructions according to an exemplary embodiment of the present disclosure. A request for a panoramic image is received (502) and text annotations associated with the panoramic image are identified (504). For instance, street names, business names, building names, travel directions, etc., that are to be displayed with a particular panoramic image are identified.

At (506), surface information data associated with the panoramic image is accessed. The surface information data can include information such as the particular latitude, longitude, and altitude of surfaces depicted in the panoramic imagery. The surface information data can be accessed, for instance, from a surface information database. At (508), the method determines whether a surface is available for rendering a particular text annotation. If no surface is available, the server identifies instructions to render a virtual object in the panoramic image (510) and to render the text annotation along the surface of the virtual object (512).

If a surface is available, text effects for the text annotation can be determined or identified based on the surface information data (514). For instance, the server can adjust the text sizing and orientation of a plain text annotation relative to the surface of an object until the text annotation appears to be located on the surface of the object. In a particular embodiment, the text effects for a particular text annotation can be determined based on surface information and stored in a database associated with the server. In this manner, text annotation data can be more rapidly identified by the server for delivery to a client device. Once the particular text effects have been determined, instructions to render the text annotation with particular text effects can be provided (516) for use in rendering the text annotation with the panoramic image. As shown in FIG. 8, the server transmits the panoramic image and text annotation instructions to the client device (412).

Although the present embodiment is discussed with reference to the server determining text effects for particular text annotations based on surface information data, those of ordinary skill in the art, using the disclosures provided herein, should understand that the client device could similarly compute text effects for a text annotation such that when rendered, the text annotation appears to be located along the surface of an object depicted in the panoramic image. For instance, the server can transmit surface information along with a panoramic image. The client device could compute appropriate text effects for a text annotation based on the surface information received from the server. The client device could then render the text annotation with the text effects such that the text annotation appears to be located on the surface of an object depicted in the panoramic image.

Referring back to FIG. 8, upon receipt of the panoramic image and text annotation instructions (414), the client device displays the panoramic image to the user through any suitable user interface (416). The client device then renders text annotations (418) with text effects based on the instructions received from the server such that the text annotations appear to be located along a surface of objects depicted in the panoramic imagery.

At (420), the client device receives a user interaction with a text annotation and transmits a request for further information associated with the user interaction to the server. The server receives notification of the user interaction at (422) and transmits information responsive to the user interaction to the client device (424). The responsive information can include, for instance, additional information associated with the text annotation or the next step in travel directions. The client device then displays the responsive information to the user (526).

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for displaying imagery, comprising:
   receiving at a computing device at least a portion of an image of a geographic area over a network interface, the image defining a three-dimensional space and depicting at least one object captured by a camera;
   presenting a viewport in the display of the computing device that displays at least a portion of the image;
   obtaining instructions to render a text annotation associated with the object depicted in the image, the instructions specifying text effects for the text annotation, the text effects being determined based at least in part on surface information data providing a geographic position of a surface of the object in the geographic area; and
   rendering a text annotation pursuant to the instructions with text effects such that the text annotation appears to be located in the three-dimensional space along at least a portion of the surface of the object depicted in the image, wherein the text annotation comprises at least a portion of travel directions;
   wherein the text annotation is interactive.

2. The method of claim 1, wherein the text effects specify varying character sizes for the text annotation.

3. The method of claim 1, wherein the text effects specify an orientation of the text annotation such that the text annotation is rendered on a baseline positioned along at least a portion of the surface of the object depicted in the image.

4. The method of claim 1, wherein the text annotation is rendered in a fixed location relative the image such that as a user navigates the image, the text annotation remains in a fixed location along at least a portion of the surface of the object depicted in the image.

5. The method of claim 1, wherein the text annotation is rendered such that the text annotation appears to be located along the façade of a building depicted in the image.

6. The method of claim 1, wherein the text annotation comprises information associated with the object on which the text annotation is rendered.

7. The method of claim 1, wherein upon user interaction with the text annotation, the method comprises presenting additional information to the user.

8. The method of claim 7, wherein upon user interaction with the text annotation, the method presents imagery associated with the next step in the travel directions.

9. The method of claim 1, wherein the image comprises street level imagery.

10. The method of claim 1, wherein the method comprises:
    rendering a virtual object in the three-dimensional space defined by the image; and
    rendering a text annotation such that the text annotation appears to be located along a surface of the virtual object.

11. The computer-implemented method of claim 1, wherein the image comprises a plurality of pixels, the surface information data comprising a value stored for each of the plurality of pixels, the value representing the geographic position of the surface of the object illustrated in the pixel.

12. The computer-implemented method of claim 1, wherein the surface information data is determined based at least in part on a three-dimensional model associated with the image.

13. The computer-implemented method of claim 1, wherein the surface information data comprises latitude, longitude, and altitude coordinates associated with the surface of the object.

14. A system for displaying imagery, comprising:
    a display device;
    one or more processors; and
    at least one memory coupled to the one or more processors, the at least one memory comprising computer-readable instructions for execution by the one or more processors to cause said one or more processors to perform operations, comprising:
    receiving at least a portion of an image of a geographic area over a network interface, the image defining a three-dimensional space and depicting at least one object captured by a camera;
    presenting a viewport on the display device that displays at least a portion of the image;
    receiving, via the network interface, instructions to render an interactive text annotation associated with the object depicted in the image, the instructions specifying text effects for the interactive text annotation, the text effects being determined at a remote server based at least in part on surface information data stored at a remote surface information database, the surface information data being associated with the image by the remote server prior to receiving the at least a portion of the image of the geographic area over the network interface; and
    rendering an interactive text annotation pursuant to the instructions with text effects such that the text annotation appears to be located in the three-dimensional space along at least a portion of a surface of the object depicted in the image.

15. The system of claim 14, wherein the text effects specify an orientation of the text annotation such that the text annotation is rendered on a baseline positioned along at least a portion of the surface of the object depicted in the image.

16. The system of claim 14, wherein the text annotation is fixed relative the image such that as a user navigates the image, the text annotation remains in a fixed location along at least a portion of the surface of the object depicted in the image.

17. The system of claim 14, wherein the text annotation comprises at least a portion of travel directions.

18. The system of claim 14, wherein the text annotation comprises at least a portion of travel directions, wherein upon user interaction with the text annotation, the system is configured to present imagery associated with the next step in the travel directions.

19. The system of claim 14, wherein the surface information data comprises distance data representing the distance of the surface of the object to a camera.

20. A system for providing geographic images, the system comprising a processing device and a network interface, the processing device configured to:
    receive a request for an image of a geographic area, the image defining a three dimensional space and depicting at least one object captured by a camera;
    access a three-dimensional model associated with the geographic area depicted in the image to identify the location of a surface of the at least one object depicted in the image;

obtain instructions to render a text annotation with text effects such that the text annotation appears to be located in the three dimensional space along the surface of the at least one object, the text effects being determined based at least in part on the location of the surface identified in three-dimensional model; and provide, via the network interface, at least a portion of the image and the instructions to another processing device.

21. The system of claim 20, wherein the text annotation is interactive.

22. The system of claim 21, wherein the text annotation comprises at least a portion of travel directions, wherein upon user interaction with the text annotation, the system is configured to present imagery associated with the next step in the travel directions.

23. A computer-implemented method for displaying panoramic imagery, comprising:

receiving at a computing device at least a portion of a panoramic image of a geographic area, the panoramic image defining a three-dimensional space and depicting at least one object captured by a camera;

presenting a viewport in the display of the computing device that displays at least a portion of the panoramic image;

obtaining instructions to render a text annotation associated with the object depicted in the image, the instructions specifying text effects for the text annotation; and rendering the text annotation pursuant to the instructions with text effects such that the text annotation appears to be located in the three-dimensional space along at least a portion of the surface of the object depicted in the image;

wherein the text annotation comprises at least a portion of travel directions, wherein upon user interaction with the text annotation, the method comprises presenting panoramic imagery associated with the next step in the travel directions in the viewport.

24. The computer-implemented method of claim 23, wherein the user interaction with the text annotation comprises clicking or tapping the text annotation.

\* \* \* \* \*